US011664016B2

(12) United States Patent
Tian et al.

(10) Patent No.: US 11,664,016 B2
(45) Date of Patent: May 30, 2023

(54) DISTINGUISH DEVICES IN PAN/VAN (71) Applicant: MOTOROLA SOLUTIONS, INC., Chicago, IL (US)

(72) Inventors: Yong Tian, Chengdu (CN); Dong Zhao, Chengdu (CN); Xun Fei, Chengdu (CN); Hai-Qing Hu, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 301 days.

(21) Appl. No.: 16/954,541

(22) PCT Filed: Jan. 23, 2018

(86) PCT No.: PCT/CN2018/073847
§ 371 (c)(1),
(2) Date: Jun. 17, 2020

(87) PCT Pub. No.: WO2019/144284
PCT Pub. Date: Aug. 1, 2019

(65) Prior Publication Data
US 2020/0349929 A1 Nov. 5, 2020

(51) Int. Cl.
G10L 15/22 (2006.01)
G10L 15/18 (2013.01)
H04W 4/06 (2009.01)

(52) U.S. Cl.
CPC .......... G10L 15/1815 (2013.01); G10L 15/22 (2013.01); H04W 4/06 (2013.01)

(58) Field of Classification Search
None
See application file for complete search history.

(56) References Cited

U.S. PATENT DOCUMENTS

| 9,075,435 | B1 | 7/2015 | Noble et al. | |
| 2006/0248183 | A1 | 11/2006 | Barton | |
| 2008/0159242 | A1* | 7/2008 | Rayzman | H04W 84/12 |
| | | | | 455/552.1 |
| 2013/0237199 | A1 | 9/2013 | Djavaherian et al. | |
| 2016/0142157 | A1 | 6/2016 | Jeong et al. | |

FOREIGN PATENT DOCUMENTS

| CN | 104238482 A | 12/2014 |
| CN | 105527852 A | 4/2016 |
| CN | 106647311 A | 5/2017 |

OTHER PUBLICATIONS

The International Search Report and the Written Opinion corresponding patent application No. PCT/CN2018/073847 filed Jan. 23, 2018, dated Oct. 10, 2018, all pages.
The International Search Report and the Written Opinion, corresponding patent application No. PCT/CN2018/073847 filed Jan. 23, 2018, all pages.

* cited by examiner

Primary Examiner — Quynh H Nguyen
(74) Attorney, Agent, or Firm — Daniel R. Bestor (57) ABSTRACT A method and apparatus for providing an audible identification of a device is provided herein. During operation, device identities will be determined for members forming a personal-area network (PAN). When information is conveyed by a device, a determination of whether or not to announce a device identification will be based on a combination of PAN members present. More particularly, when a certain combination of devices are members of the PAN, device identifications will be announced, otherwise, device identifications will not be announced.

12 Claims, 4 Drawing Sheets

DISTINGUISH DEVICES IN PAN/VAN

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable information and resources such as vehicle histories, arrest records, outstanding warrants, health information, real-time traffic, device status information, and any other information that may aid the user.

Many such communication devices further comprise, or provide access to, a voice output and/or electronic digital assistants (or sometimes referenced as "virtual partners") that may provide the user thereof with audible information in an automated (e.g., without further user input) and/or semi-automated (e.g., with some further user input) fashion. The audible information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

A problem occurs when a user carries more than one device and it can be ambiguous as to what piece of equipment a voice announcement is referring to. For example, if the user forgets there is more than one radio present, and hears a radio announce "please change to channel 2", it can be troublesome for the user in some scenarios if the wrong radio is changed to channel 2. As a further example of the problem, consider a case where a device announces a low-battery alert. If multiple devices require battery power, the user may mistakenly identify what device is running low on power.

A solution to the above-mentioned problem is to simply have every device announce its identity when conveying information via a voice announcement (or alternatively have a virtual partner convey the identity). While this solution may alleviate mistaking devices for one another, the constant announcement of a device identification prior to information being conveyed to a user will be particularly annoying, especially in cases where it is not necessary to do so. For example, if a user is carrying a single police radio, simply hearing an audio stream stating, "please change to channel 2" will convey sufficient information to the user. It is not necessary to announce "Your police radio is requiring a change to channel 2".

Therefore, it would be beneficial to provide for a method and apparatus for alleviating confusion from voice announcements, yet eliminate the annoying process of having every device present identify itself when a voice announcement being output.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for providing an audible identification of a device is provided herein. During operation, device identities will be determined for members forming a personal-area network (PAN). When information is conveyed by a device, a determination of whether or not to announce a device identification will be based on a combination of PAN members present. More particularly, when a certain combination of devices are members of the PAN, device identifications will be announced, otherwise, device identifications will not be announced.

It should be noted that the device identification may be announced as part of a communication from a virtual assistant (virtual partner, digital assistant). The virtual assistant will announce information about devices associated with the PAN, or alternatively, the device itself may announce the information about itself based on PAN members present. For example, a device may announce a "low-battery alert", and the virtual assistant may convey the device ID, for example, "your police radio just announced a low-battery alert". Alternatively, the device may simply announce "police-radio, low-battery alert". Regardless, the decision to announce a device identification or not will be based on PAN members present.

Expanding on the above, the subject matter of the announcement may be considered when determining whether or not to announce a device identification. For example, if the information conveyed is "powering off", and multiple PAN devices may be powered off, then the device identification will be announced prior to the conveyed information (e.g., police radio powering off). However, if the information conveyed is "changing to channel 2", and only a single PAN device is capable of changing channels, then no device identification will be announced prior to conveying the information.

As a further example of the above, consider the situation where a public-safety officer has a single police radio, smart handcuffs, and a camera forming a PAN. Assume that the radio is switched to channel 2 (either automatically or manually). Since there can be little chance of ambiguity in what device is changing channels, an announcement may be made "switching to channel 2". However, consider the situation where the public-safety officer now has two radios as part of the PAN, the announcement "switching to channel 2" may be ambiguous since two radios are capable of switching channels. Because of this, a device identification will be announced when the information is conveyed to the user.

As a further example, consider a PAN having only a single radio, handcuffs, and a camera. If the camera is the only PAN device capable of taking video, the information "video being taken" will not be ambiguous, and no device identification will be announced prior to the information being conveyed. However, consider the information that the camera is powering down. Since all devices may be powered down, a device identification will be announced prior to, along with, or after the information "powering down" is conveyed.

Figure 1:
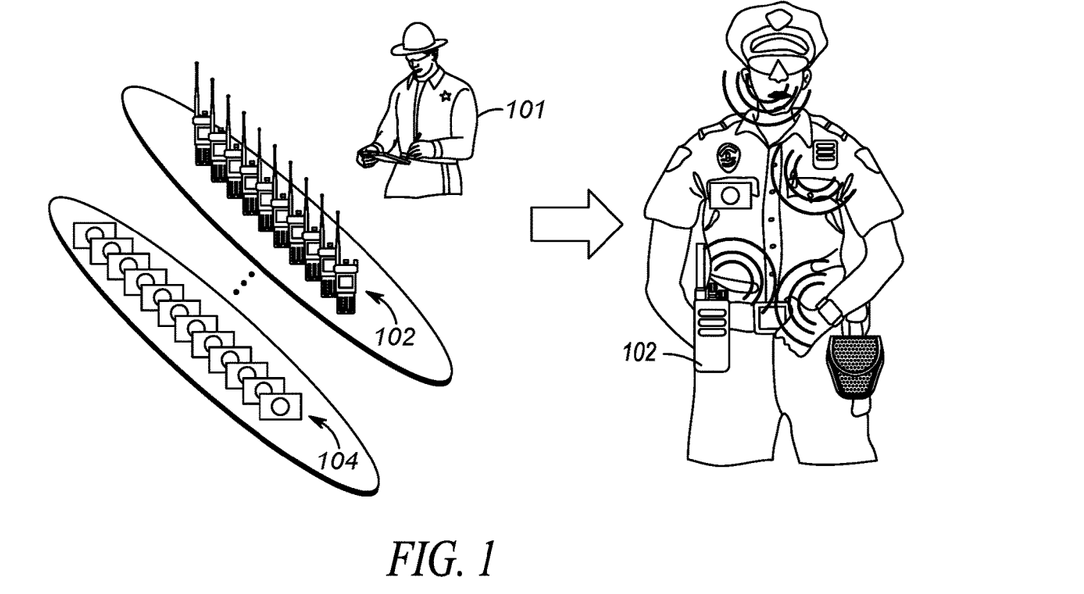
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer, along with other devices that supply information to the public-safety officer. Certain conditions are generally reported back to a dispatch center so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, a bio-sensor, . . . , etc. All devices pulled by the officer will be configured to form a PAN by associating (pairing) with each other and communicating wirelessly among the devices. At least one device may be configured with a digital assistant. In a preferred embodiment, the PAN comprises more than two devices, so that many devices are connected via the PAN simultaneously.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may pull one radio 102 and one camera 104 for use during their shift. Other devices may be pulled as well. As shown in FIG. 1, officer 101 will preferably wear the devices during a shift by attaching the devices to clothing. These devices will form a PAN throughout the officer's shift.

Figure 2:
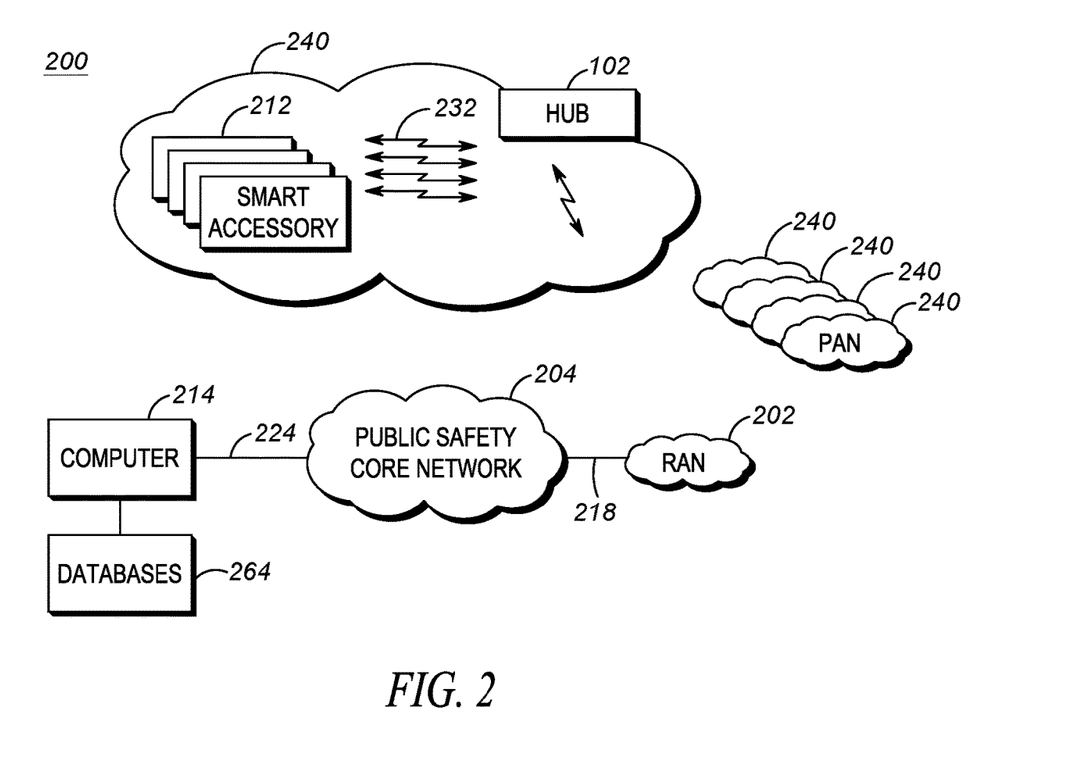
FIG. 2 depicts an example communication system that incorporates a personal-area network and a digital assistant.

FIG. 2 depicts an example communication system 200 that incorporates PANs created as described above. System 200 includes one or more radio access networks (RANs) 202, a public-safety core network 204, hub (PAN master device) 102, local devices (slave devices that serve as smart accessories/sensors) 212, computer 214, and communication links 218, 224, and 232. In a preferred embodiment of the present invention, hub 102 and devices 212 form PAN 240, with communication links 232 between devices 212 and hub 102 taking place utilizing a short-range communication system protocol such as a Bluetooth communication system protocol. Each officer will have an associated PAN 240. Thus, FIG. 2 illustrates multiple PANs 240 associated with multiple officers.

Slave devices 212 continuously determine (via self diagnostics, self sensing, . . . , etc.) environmental conditions and/or device conditions (e.g., low battery, channel change, . . . , etc.). This information may be provided to hub 102 via standard PAN messaging as part of a periodic status update message. Alternatively, the information may be provided to hub 102 upon a trigger (environmental event detected, device status detected, . . . , etc).

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art. RAN 202 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 202 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 202 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 204 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 204 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Hub 102 serves as a PAN master device, and may be any suitable computing and communication device configured to engage in wireless communication with the RAN 202 over the air interface as is known to those in the relevant art. Moreover, one or more hub 102 are further configured to engage in wired and/or wireless communication with one or more local device 212 via the communication link 232. Hub 102 will be configured to determine when to forward information received from PAN devices to, for example, a dispatch center. The information can be forwarded to the dispatch center via RANs 202 based on a combination of device 212 inputs. In one embodiment, all information received from accessories 212 will be forwarded to computer 214 via RAN 202. In another embodiment, hub 102 will filter the information sent, and only send high-priority information back to computer 214. Hub 102 may also determine when to announce an identity of a device making a voice announcement.

It should also be noted that any one or more of the communication links 218, 224, could include one or more wireless-communication links and/or one or more wired-communication links.

Devices 212 and hub 102 may comprise any device capable of forming a PAN. For example, devices 212 may comprise a police radio, a gun-draw sensor, a body temperature sensor, an accelerometer, a heart-rate sensor, a breathing-rate sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a biometric sensor (e.g., wristband), a barometer, speech recognition circuitry, a gunshot detector, . . . , etc.

Computer 214 comprises, or is part of, a computer-aided-dispatch center (sometimes referred to as an emergency-call center), that may be manned by an operator providing necessary dispatch operations. For example, computer 214 typically comprises a graphical user interface that provides the dispatch operator necessary information about public-safety officers. As discussed above, much of this information originates from devices 212 providing information to hub 102, which forwards the information to RAN 202 and ultimately to computer 214.

Hub 102 comprises a virtual partner (e.g., a microprocessor serving as a virtual partner/digital assistant) that is configured to receive data from sensors/accessories 212, keep track of relevant information and understand the situational context of user. The virtual partner will reactively provide officer-requested information, or may provide information automatically based one or more sensor status or triggers in which the virtual partner may proactively provide such valuable information to the user absent any explicit request from the user (e.g., "I see you have drawn your weapon, do you need assistance").

Expanding on the above, each user of the system may possess a hub with many associated devices forming a PAN. For each user of the system, computer 214 may track the user's current associated PAN devices (accessories 212) along with sensor data for that user. This information may be used to compile a summary for each user (e.g., equipment on hand for each user, along with state information for the equipment). The information is preferably stored in database 264, or may be stored in a database located in hub 102 (not shown in FIG. 2). This information may be used by any virtual partner to provide valuable content to the user. As discussed, the content may be provided spontaneously, or in response to a query.

With the above in mind, hub 102 is also configured with a natural language processing (NLP) engine configured to determine the intent and/or content of the any over-the-air voice transmissions received by users, or transmissions received by PAN devices 212. The NLP engine may also analyze oral queries and/or statements received by any user and provide responses to the oral queries and/or take other actions in response to the oral statements. It should be noted that any over-the-air communication between users (e.g., on the talkgroup) will be monitored by the NLP engine in order to determine the content of the over-the-air voice transmission.

Figure 3:
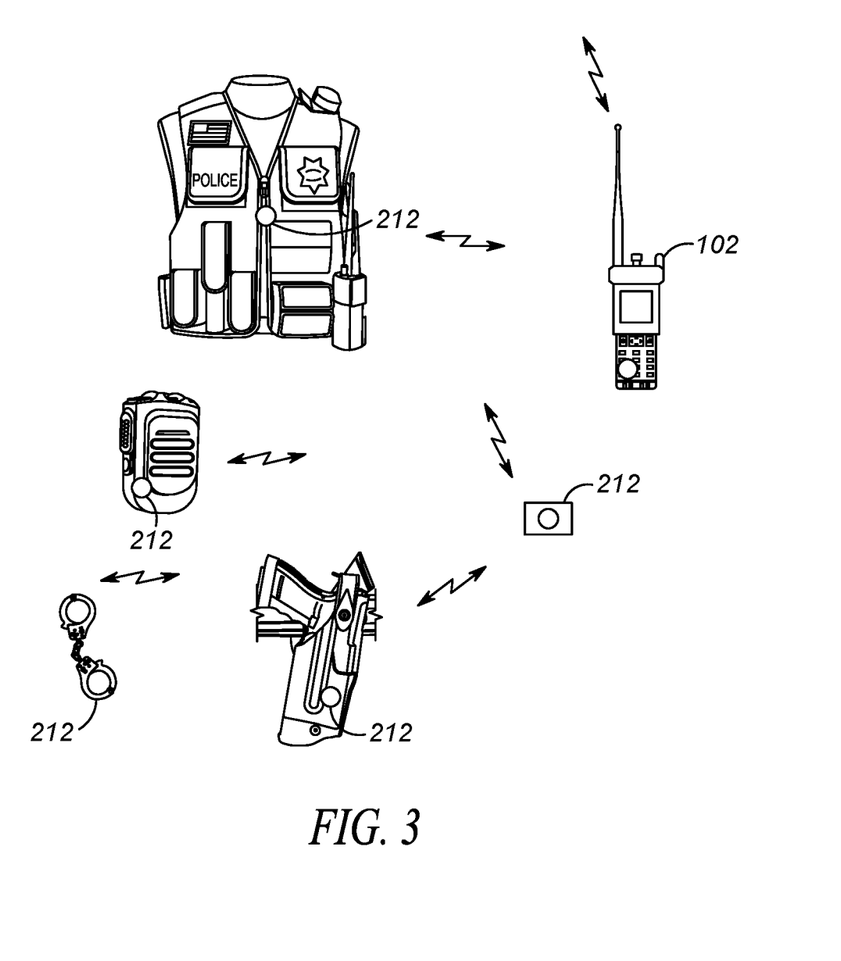
FIG. 3 is a more-detailed view of a personal-area network of FIG. 2.

FIG. 3 depicts another view of a personal-area network 240 of FIG. 2. Personal-area network comprises a very local-area network that has a range of, for example 10 feet. As shown in FIG. 3, various devices 212 may attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, and a camera 212 is provided.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a master device while devices 212 serve as slave devices.

Hub 102 provides information to the officer, and forwards local status alert messages describing each sensor state/trigger event over a wide-area network (e.g., RAN/Core Network) to computer 214. In alternate embodiments of the present invention, hub 102 may forward the local status alerts/updates for each sensor to mobile and non-mobile peers (shift supervisor, peers in the field, etc), or to the public via social media. RAN core network preferably comprises a network that utilizes a public-safety over-the-air protocol. Thus, hub 102 receives sensor information via a first network (e.g., Bluetooth PAN network), and forwards the information to computer 214 via a second network (e.g., a public safety wide area network (WAN)). When the virtual partner is located within computer 214, any request to the virtual partner will be made via the second network. In addition, any communication from the virtual partner to computer 214 will take place using the second network.

As described above, when a device/sensor 212 or hub 102 announces status information, the user may confuse what device announced the status information. In order to address this issue, a determination is made as to whether or not the status information may be ambiguous (i.e., more than one PAN device could announce the same status information). If so, the device/sensor 212 or hub 102 will announce the identity of the device that made the announcement.

In an alternate embodiment of the present invention, the PAN master device will announce an identity of PAN members that make potentially ambiguous voice announcements. More particularly, hub 102 will make a determination if an announcement made by a sensor/device 212 may be ambiguous (i.e., more than one PAN device could make the same announcement). If so, the PAN master device will announce the identity of the device that that the status information announcement pertains to.

The determination as to whether or not a voice announcement of status information may be ambiguous is made by determining the devices present as part of the PAN, determining the subject matter of the status information, and determining if the status information in the voice announcement could pertain to more than one device present. A database, such as that shown in table 1 may be used to aide in this decision making

TABLE 1

Example of devices present (PAN members) and their subject matter of possible announcements.

| Devices Present | Subject Matter of Potential Announcements |
|---|---|
| Radio 1 | Power, channel, volume |
| Camera | Power, Acquiring Video, Acquiring an Image |
| Radio 2 | Power, channel, volume |
| Gun Draw Detector | Power, Gun Holster Status |

Considering table 1, a PAN currently comprises Radio 1, Radio 2, a gun-draw detector, and a camera. Since all PAN members have "power" as subject matter of possible status announcement, if any announcement is made regarding power of any device, a device identification will be announced as well. However, since an announcement about video being acquired can only pertain to the camera, no device identification will be announced when acquiring video is the subject matter of a status announcement.

Therefore, when determining if an announcement may be ambiguous, the subject matter of the announcement is determined, a database is accessed to determine if the subject matter can be associated with more than one PAN member, and if so, a device identity is announced as well.

Figure 4:
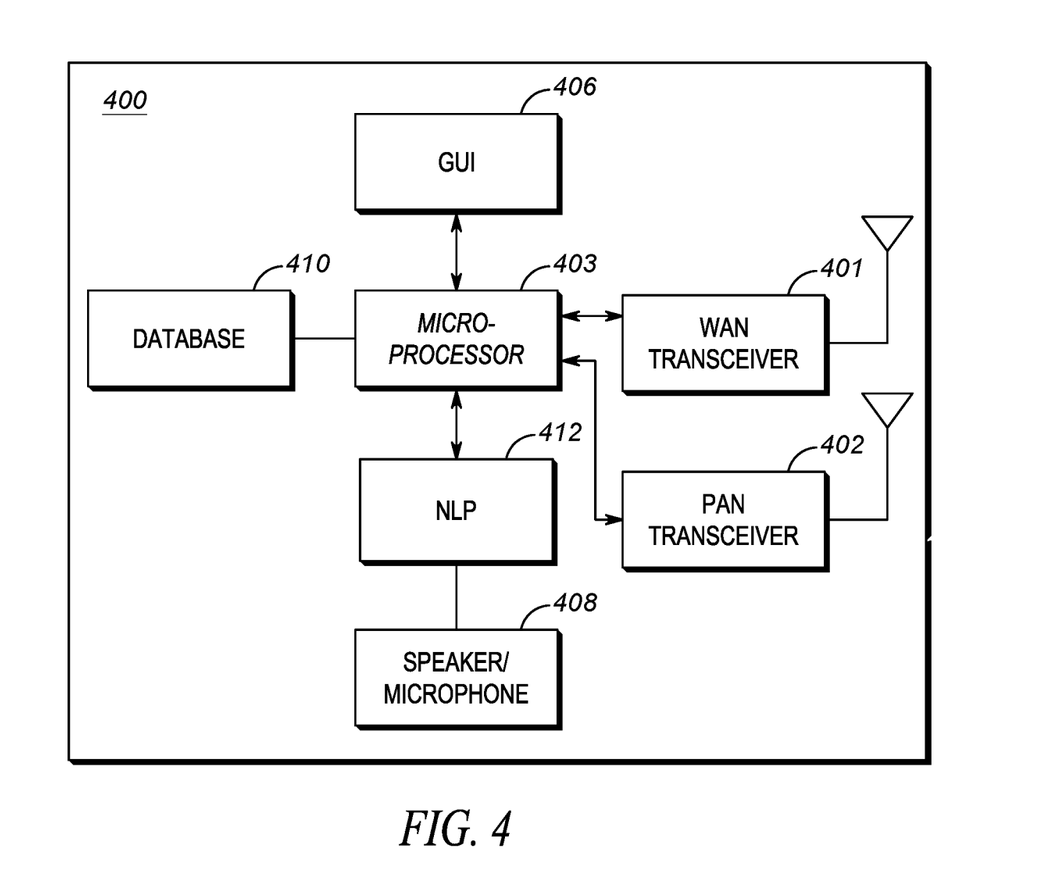
FIG. 4 is a block diagram of a hub.

With the above examples in mind, FIG. 4 sets forth a schematic diagram that illustrates a device 102, or a device 212 for selectively announcing an identity of a device based on PAN members present. In an embodiment, the device comprises hub 102, however in alternate embodiments the device may be embodied within the public-safety core network 204, or more computing devices in a cloud compute cluster (not shown), or some other communication device not illustrated in FIG. 2, and/or may be a distributed communication device across two or more entities.

FIG. 4 shows those components (not all necessary) for a device 400 to determine if an announcement may be ambiguous. The components shown in device 400 can exist within hub 102 or sensors 212. In other words, hub 102 or sensors/devices 212 can determine the subject matter of an announcement, determine PAN members present, access a database to determine if the subject matter can be associated with more than one PAN member, and if so, announce an identity of a device.

As shown, device 400 may include a wide-area-network (WAN) transceiver 401 (e.g., a transceiver that utilizes a public-safety communication-system protocol), PAN transceiver 402 (e.g., a short-range transceiver), Graphical User Interface (GUI) 406, database 410, logic circuitry 403, speaker 408 and NLP 412. In other implementations, device 400 may include more, fewer, or different components.

WAN transceiver 401 may comprise well known long-range transceivers that utilize any number of network system protocols. (As one of ordinary skill in the art will recognize, a transceiver comprises both a transmitter and a receiver for transmitting and receiving data). For example, WAN transceiver 401 may be configured to utilize a next-generation cellular communications protocol operated by a cellular service provider, or any public-safety protocol such as an APCO 25 network or the FirstNet broadband network. WAN transceiver 401 provides sensor status updates to dispatch center 214.

PAN transceiver 402 may be well known short-range (e.g., 30 feet of range) transceivers that utilize any number of network system protocols. For example, PAN transceiver 402 may be configured to utilize Bluetooth communication system protocol for a body-area network, or a private 802.11 network. PAN transceiver forms the PAN (acting as a master device) with various accessories 212.

GUI 406 comprises provides a way of displaying information and receiving an input from a user. For example, GUI 406 may provide a way of conveying (e.g., displaying) information to a user regarding that status of devices 212.

Speaker/microphone 408 provides a mechanism for receiving human voice and providing it to the virtual partner (e.g., logic circuitry 403/NLP 412), along with providing audible information generated by the digital assistant (e.g., a voice, a device identification, . . . , etc.).

Logic circuitry 403 comprises a digital signal processor (DSP), general purpose microprocessor, a programmable logic device, or application specific integrated circuit (ASIC) and is configured along with NLP 412 to provide digital assistant functionality and assist in determining if an announcement may be confusing or ambiguous.

Database 410 is provided. Database 410 comprises standard memory (such as RAM, ROM, . . . , etc) and serves to store PAN member names (identifications), and possible subject matter for announcements as shown in Table 1. Database 410 also stores status information for each sensor (e.g., long gun in use, bullet-proof vest being worn, dundraw sensor indicating a gun is holstered, camera indicating low power, . . . , etc.). The status information is regularly passed from sensors to hub 102 as part of normal PAN operations.

NLP 12 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Device 400 provides for an apparatus comprising a personal-area-network (PAN) transceiver 402 configured to receive identities of PAN members. The identities are received as part of normal PAN formation procedures. Database 410 is provided comprising PAN members and subject matter of potential announcements for each PAN member. Logic circuitry 403 is provided, and configured to receive the identities from the PAN transceiver, determine a subject matter of an announcement, access database 410 to determine if the subject matter of the announcement exists as subject matter of potential announcements for more than one PAN member, and determine that the subject matter of the announcement is ambiguous when the subject matter of the announcement exists as subject matter of potential announcements for more than one PAN member. Finally, speaker 408 configured to output a device identity when the announcement is determined to be ambiguous.

As discussed, the speaker may be configured to receive the announcement audibly, with natural-language processor (NLP) 412 coupled to the logic circuitry, and configured along with the logic circuitry to receive the audible announcement and determine the subject matter of the announcement.

As discussed above, the PAN transceiver is further configured to receive status update messages from the PAN members as part of a periodic updating process, as requested, or when triggered by sensor/device 212. The logic circuitry is configured to determine the device identity from the status update messages.

A wide-area network (WAN) transceiver is provided for transmitting information contained within the status update messages.

In a first embodiment, hub 102 announces identities of sensors/devices 212 after sensors/devices 212 audibly (i.e., audible to the human ear) announce status information. In this scenario, NLP 412 will receive the announcement via microphone 408, determine the subject matter of the announcement. The subject matter of the announcement will be passed to logic circuitry 403. Logic circuitry 403 will determine PAN members present, and if the subject matter of the announcement could be ambiguous. If so, logic circuitry 403 will announce the identity of the device in which the announcement pertains.

In a second embodiment, devices/sensors 212 will announce their own status information and make the determination on whether or not to announce a device name. In this scenario, PAN transceiver 402 will receive identities of PAN members. Logic circuitry 403 will determine the subject matter of the announcement. Logic circuitry 403 will then determine if the announcement could be ambiguous. If the subject matter of the announcement could be ambiguous, the identity of the device will be announced prior, after, or along with status information being announced.

Figure 5:
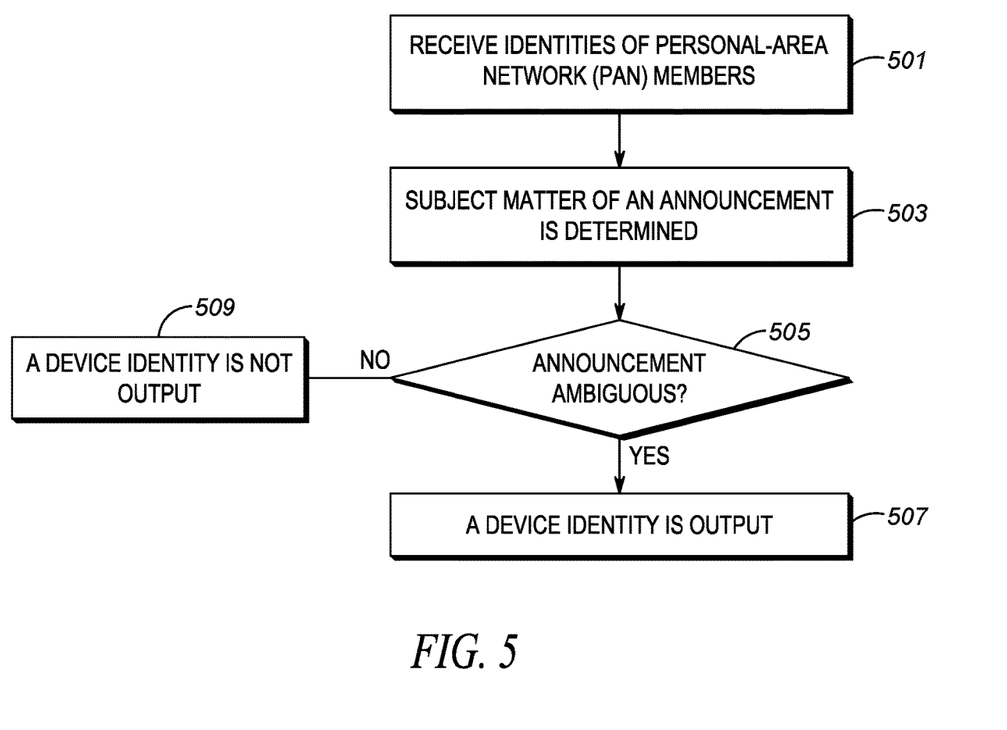
FIG. 5 is a flow chart showing operation of the hub of FIG. 4.

FIG. 5 is a flow chart showing operation of device 400 during the performance of both the first and the second embodiment. The logic flow begins at step 501 where PAN transceiver 402 receives identities of personal-area network (PAN) members over a PAN. Subject matter of an announcement is determined at step 503. As discussed above, logic circuitry 403 may determine this by self-diagnostic techniques, or if the announcement was received audibly by hub 102, NLP processor 412, along with logic circuitry 403 may use NLP techniques to determine the subject matter.

At step 505, database 410 is accessed in order to determine if the subject matter of the announcement is ambiguous. As discussed above, the announcement is ambiguous if the subject matter of the announcements exists as subject matter of potential announcements for more than one PAN member within database 410. As discussed, database 410 comprises PAN members and subject matter of potential announcements for each PAN member. As discussed above, it is determined that the subject matter of the announcement is ambiguous when the subject matter of the announcement exists as subject matter of potential announcements for more than one PAN member.

At step 505, if it is determined the announcement is ambiguous, the logic flow continues to step 507 where a device identity is output when the announcement is determined to be ambiguous, otherwise the logic flow continues to step 509 where no identity is output.

As discussed, status update messages may be received from the PAN members, and the device identity can be determined from the status update messages. Information contained in the status update messages may be transmitted to, for example, a dispatch center over wide-area network (WAN) 204.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a personal-area-network (PAN) transceiver configured to receive identities of a plurality of electronic device PAN members;
   a database comprising electronic device PAN members and corresponding subject matter of potential status announcements applicable for each electronic device PAN member;
   logic circuitry, configured to:
      receive the identities from the PAN transceiver;
      determine a subject matter of an audible announcement to be played back via a speaker in the PAN and that provides a status update of a particular one of the plurality of the electronic device PAN members;
      access the database to determine if the subject matter of the audible announcement to be played back exists as a potential status announcements that could apply to more than one of the plurality of electronic device PAN members;
      determine that the audible announcement to be played back is ambiguous when the subject matter of the audible announcement exists as a potential status announcements that could apply to more than one of the plurality of electronic device PAN members;
      when the audible announcement is determined to be ambiguous, cause the audible announcement to be played back via the speaker accompanying an added audible device identifier identifying the particular electronic device PAN member to which the status update pertains; and
      when the audible announcement is determined to not be ambiguous, cause the audible announcement to be played back via the speaker without accompanying the added audible device identifier identifying the particular electronic device PAN member to which the status update pertains.

2. The apparatus of claim 1 further comprising:
   a natural-language processor (NLP) coupled to the logic circuitry, configured to determine the subject matter of the announcement.

3. The apparatus of claim 1 wherein:
   the PAN transceiver is further configured to receive status update messages directly from the electronic device PAN members; and
   wherein the logic circuitry is further configured to determine the added audible device identifier from the status update messages.

4. The apparatus of claim 3 further comprising:
   a wide-area network (WAN) transceiver configured to transmit information contained within the status update messages via the WAN.

5. The apparatus of claim 1, wherein the subject matter of the audible announcement is determined to be power level status, the power level status could apply to more than one of the plurality of electronic device PAN members and is thus ambiguous, and wherein the logic circuitry is further configured to cause the audible announcement to be played back via the speaker accompanying the added audible device identifier identifying the particular electronic device PAN member to which the power level status update pertains.

6. The apparatus of claim 1, wherein the subject matter of the audible announcement is determined to be video capture status, the video capture status could apply to only one of the plurality of electronic device PAN members and is thus not ambiguous, and wherein the logic circuitry is further configured to cause the audible announcement to be played back via the speaker without accompanying the added audible device identifier identifying the particular electronic device PAN member to which the video capture status update pertains.

7. A method comprising the steps of:
   receiving, via a personal-area network (PAN) transceiver, identities of a plurality of electronic device PAN members;
   determining a subject matter of an audible announcement to be played back via a speaker in the PAN and that provides a status update of a particular one of the plurality of the electronic device PAN members;
   accessing a database comprising electronic device PAN members and corresponding subject matter of potential status announcements applicable for each electronic device PAN member in order to determine if the subject matter of the audible announcement to be played back exists as a potential status announcements that could apply to more than one of the plurality of electronic device PAN members;
   determining that the audible announcement to be played back is ambiguous when the subject matter of the audible announcement exists as a potential status announcements that could apply to more than one of the plurality of electronic device PAN members;
   when the audible announcement is determined to be ambiguous, causing the audible announcement to be played back via the speaker accompanying an added audible device identifier identifying the particular electronic device PAN member to which the status update pertains; and when the audible announcement is determined to not be ambiguous, causing the audible announcement to be played back via the speaker without accompanying the added audible device identifier identifying the particular electronic device PAN member to which the status update pertains.

8. The method of claim 7 further comprising the step of: using natural-language processing to determine the subject matter of the audible announcement.

9. The method of claim 7 further comprising the steps of: receiving status update messages directly from the electronic device PAN members; and determining the added audible device identifier from the status update messages.

10. The method of claim 9 further comprising the step of: transmitting information contained within the status update messages over a wide-area network (WAN).

11. The method of claim 7, wherein the subject matter of the audible announcement is determined to be power level status, the power level status could apply to more than one of the plurality of electronic device PAN members and is thus ambiguous, and the method further comprising the step of causing the audible announcement to be played back via the speaker accompanying the added audible device identifier identifying the particular electronic device PAN member to which the power level status update pertains.

12. The method of claim 7, wherein the subject matter of the audible announcement is determined to be video capture status, the video capture status could apply to only one of the plurality of electronic device PAN members and is thus not ambiguous, and the method further comprising the step of causing the audible announcement to be played back via the speaker without accompanying the added audible device identifier identifying the particular electronic device PAN member to which the video capture status update pertains.

* * * * *